(12) United States Patent
Yu et al.

(10) Patent No.: US 8,646,318 B2
(45) Date of Patent: Feb. 11, 2014

(54) LEAK SENSOR APPARATUS FOR SENSING MOISTURE

(75) Inventors: Dong Geun Yu, Seoul (KR); Hong Geun Yu, Suwon (KR)

(73) Assignee: Yumin System Technology Co., Ltd., Gyeonggi-Do (KR)

( * ) Notice: Subject to any disclaimer, the term of this patent is extended or adjusted under 35 U.S.C. 154(b) by 808 days.

(21) Appl. No.: 12/319,195

(22) Filed: Jan. 2, 2009

(65) Prior Publication Data

US 2009/0173143 A1 Jul. 9, 2009

Related U.S. Application Data

(60) Provisional application No. 61/123,721, filed on Apr. 10, 2008.

(30) Foreign Application Priority Data

Jan. 9, 2008 (KR) .......................... 10-2008-0002591
Feb. 19, 2008 (KR) .......................... 10-2008-0014847

(51) Int. Cl.
*F17D 5/06* (2006.01)

(52) U.S. Cl.
USPC .................................. 73/73; 73/52; 137/15.11

(58) Field of Classification Search
USPC ........................... 73/73, 52, 304 R; 137/15.11
See application file for complete search history.

(56) References Cited

U.S. PATENT DOCUMENTS

| 4,570,477 A * | 2/1986 | Sugibuchi ................... 73/40.5 R |
| 4,801,865 A * | 1/1989 | Miller et al. ................... 324/696 |
| 7,948,388 B2 * | 5/2011 | McGinty et al. .............. 340/605 |
| 2008/0204259 A1 * | 8/2008 | Vokey et al. ................... 340/604 |

* cited by examiner

*Primary Examiner* — Hezron E Williams
*Assistant Examiner* — Paul West
(74) *Attorney, Agent, or Firm* — Rabin & Berdo, P.C.

(57) ABSTRACT

A leak sensor apparatus for sensing moisture is disclosed, which is prepared in such a manner that a base film layer, a conductive line layer and a protection film layer are sequentially stacked on its lower surface in an upward direction, and said conductive line layer includes a resistance line having a certain resistance value per unit area in a longitudinal direction, and a conductive line which is spaced apart from the resistance line and is formed in parallel with respect to the resistance line, and said protection film layer is provided with a plurality of holes which are formed at regular intervals so that the resistance line and the conductive line of the conductive line layer can be exposed to the outside through the holes, respectively.

5 Claims, 5 Drawing Sheets

LEAK SENSOR APPARATUS FOR SENSING MOISTURE

TECHNICAL FIELD

The present invention relates to a leak sensor apparatus for sensing moisture, and a leak sensor apparatus for sensing moisture which can be easily installed at a possible leakage portion, by a tape method, such as a wall, a pipe, a facility or something without additionally using a bracket, and a sensor tape can be cut by a desired length and can be used.

BACKGROUND ART

Various kinds of leak sensors are widely used for sensing the leakage of water or oil. Representatively, there are a cable type leak sensor, a band type leak sensor, a module type lean sensor or something.

Here, the cable type leak sensor is basically directed to sensing water leakage or oil leakage and to fast informing even a leakage position. The sensing line senses a certain variation (electric potential difference) generating due to a resistance of leaked liquid in relation with the current flowing along a conductive line, which leads to an accurate sensing of water leakage or oil leakage, and even leads to a recognition of leakage position.

The cable type leak sensor costs too much for installing the same, and since the length of a sensor cable is limited to 7 m, 15 m, and 30 m, a customer cannot select a desired length of the product. Since it is disadvantageous that a bracket is additionally needed for installing a sensor, an installation work is hard, and the installation of the bracket requires additional cost. A lot of time is unnecessarily needed for overcoming leakage after the leakage is sensed, and a connection to external device needs a hard work.

In the band type leak sensor, when water contacts with an electric cable while current is flowing, a resistance value changes. So, a water leakage can be sensed depending on a varying resistance value.

The resistance value settable by a leak sensor is 0 Ω~50Ω, and the output ranges from 30V DC in maximum to 100 mA, and the length of an electric line is 50 m in maximum, and the length of a band sensor is 10 m in maximum.

The band type leak sensor is able to sense the leakage of water or oil with respect to a relatively wider area at a lower cost, and the installation is easier, but a lot of errors occur with respect to a high humidity or an external impact, and it is not easy to sense a correct leak position. Related works for installation are not uniform, a lot of hard work is needed for installing the same. In addition, it is disadvantageous that a lot of investments are needed for the construction of a network or a PC use. Since the length of a cable for sensing a leakage of water or oil is limited to 1 m, 2 m, 5 m, 10 m and 20 m, a selectable range by customers is very limited. The price is relatively high for its performance, and a bracket for fixing the sensor on a bottom where the sensor is to be installed is additionally needed, which leads to a hard installation work and an additional cost. When connecting to an external device, no connection device is provided except the relay contact point method.

In the module type leak sensor, a photo sensor (light receiving part and light emitting part) is disposed in a plastic casing. In a state that liquid is not detected, a beam from the light emitting part is received, but when the beam from the light emitting part senses the liquid, a refraction index changes, so that the beam cannot be inputted into the light receiving part.

Here, the module type leak sensor senses the leakage of water or oil. The input voltage of the above device is 12V DC, and the response time is 50 msm and the available temperature is −10° C.~60° C. The sensor casing is preferably made of polypropylene.

Here, the module type leak sensor is able to sense a possible leakage portion at a lower cost, and the installation does not cost too much, and an audio alarm and a light alarm can be generated irrespective of surrounding peripherals. No errors due to moisture occur. However, the module type leak sensor is disadvantageously able to sense a very limited specific portion as compared to the cable type leak sensor, and a connection to peripherals needs a very hard work. Since an additional sensor fixing method is needed, a lot of time is needed when installing the product. Since it is designed to sense a very limited specific portion, when the position of leakage changes, it is impossible to detect the changed leaking portion.

DISCLOSURE OF THE INVENTION

Accordingly, it is an object of the present invention to provide a leak sensor apparatus for sensing moisture which is able to overcome the problems found in the conventional art.

It is another object of the present invention to provide a leak sensor apparatus for sensing moisture which can be easily installed at a possible leakage portion, by a tape method, such as a wall, a pipe, a facility or something without additionally using a bracket, and a sensor tape can be cut by a desired length and can be used.

To achieve the above objects, in a leak sensor apparatus for sensing moisture formed in an adhesive tape shape, there is provided an improved leak sensor apparatus for sensing moisture which is prepared in such a manner that a base film layer, a conductive line layer and a protection film layer are sequentially stacked on its lower surface in an upward direction, and the conductive line layer includes a resistance line having a certain resistance value per unit area in a longitudinal direction, and a conductive line which is spaced apart from the resistance line and is formed in parallel with respect to the resistance line, and the protection film layer is provided with a plurality of holes which are formed at regular intervals so that the resistance line and the conductive line of the conductive line layer can be exposed to the outside through the holes, respectively.

The resistance lines and the conductive lines of the conductive line layer are formed in a mirror shape in multiple numbers, respectively.

Two conductive lines are further formed in longitudinal directions in the conductive line layer, and resistance members are formed between the conductive lines at regular intervals, respectively.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

The leak sensor apparatus for sensing moisture according to the present invention will be described with reference to the accompanying drawings.

Figure 1:
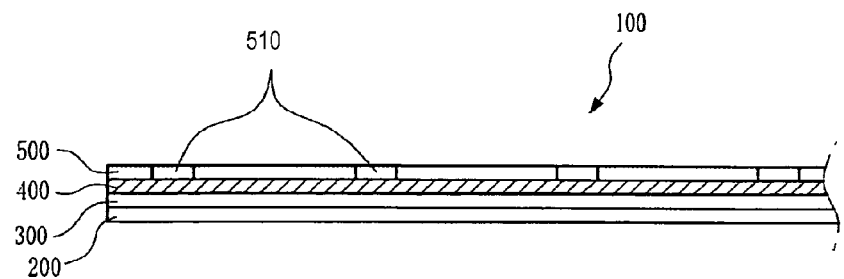
FIG. 1 is a cross sectional view illustrating a moisture sensing tape according to the present invention.

FIG. 1 is a cross sectional view illustrating a moisture sensing tape 100 according to the present invention. The moisture sensing tape 100 comprises an adhesive layer 200, a base film layer 300, a conductive line layer 400, and a protection film layer 500, which are all sequentially stacked on its lower surface in an upward direction.

The adhesive layer 200 is attached to a possible leakage portion and is formed of an adhesive tape.

The base film layer 300 is a layer for forming the conductive line layer 400 on its upper side and is made of a material of PET, PE, PTFE, PVC or other Tefrons for implementing an insulation function and for forming a certain pattern of the conductive line layer 400.

The conductive line layer 400 is a layer in which a plurality of conductive lines and resistance members are formed in a certain pattern shape and is disposed on an upper surface of the base film layer 300 in a strip shape while being spaced apart in parallel in a longitudinal direction of the moisture sensing tape 100.

The protection film layer 39 is stacked on an upper side of the conductive line layer 400 for protecting a pattern of the conductive line layer 400 from an external impact, stimulation or something and is preferably made of a certain material such as PET, PE, PVC or Tefrons.

Figure 2:
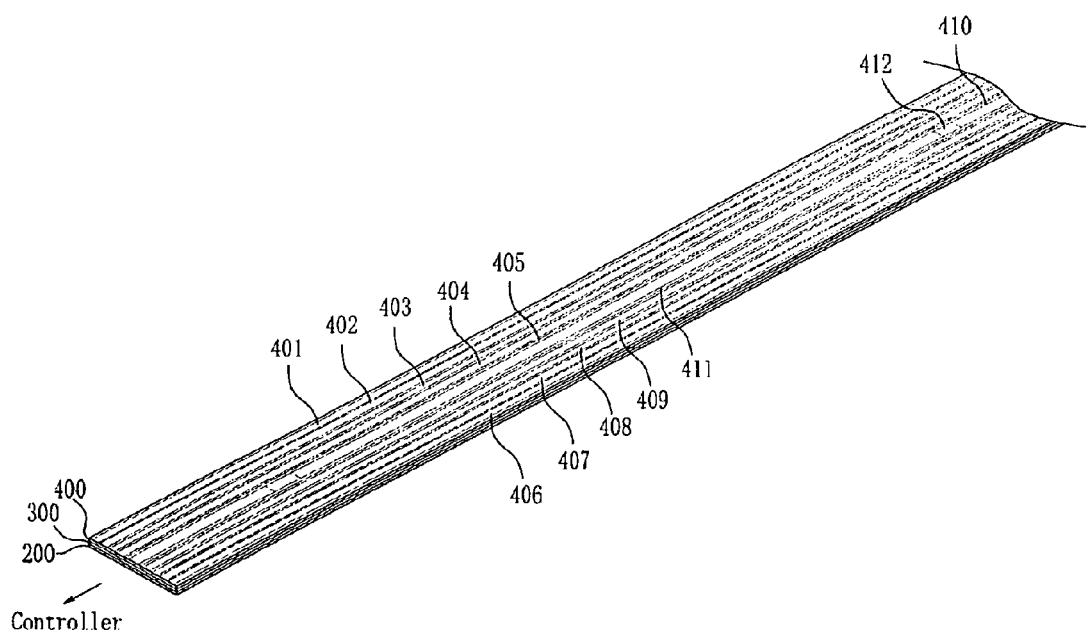
FIG. 2 is a view illustrating a pattern of a conductive line layer.

FIG. 2 is a view illustrating a pattern formation state of the conductive line layer 400. As shown therein, the resistance lines 401, 402, 406 and 407 are formed of conductive lines 403, 404, 408, 409, 410 and 411 printed with silver compound, and a resistance member 412.

The first resistance line 401 is formed on an outer most portion in the longitudinal direction of the conductive line layer 400 and has a constant resistance value per unit area, and a second resistance line 402 is spaced apart inside the first resistance line 401 in the same shape as the first resistance line 401.

Double-structure conductive lines 403 and 404 printed with a silver compound, respectively, are spaced apart inside the second resistance line 402 and are sequentially formed.

Figure 3:
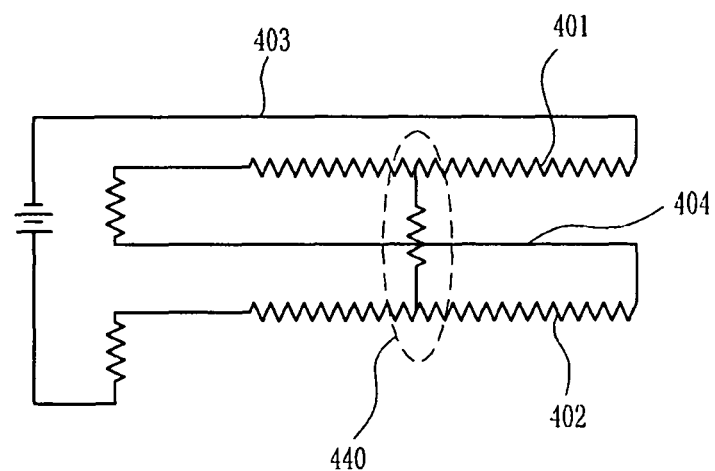
FIG. 3 is a circuit diagram of a pattern for a leak sense.

As shown in FIG. 3, the resistance lines 401 and 402 and the conductive lines 403 and 404 form a leak sensing circuit, and the first conductive line 403, the first resistance line 401, the second conductive line 404 and the second resistance line 402 are connected with one another in series by means of a connection apparatus, respectively.

In addition, the resistance lines 406 and 407 and the conductive lines 408 and 409 are formed on the upper surface of the conductive line layer 400 in the mirror shape along with the resistance lines 401 and 402 and the conductive lines 403 and 404 while being identically formed on both the outer side and inner side.

With the above construction, when leakage occurs on the upper side of the moisture sensing tape 100, the sensing work is performed over a relatively wider area.

The conductive lines 403, 404, 408 and 409 are made of pure conductive materials such as silver, etc. and each have a resistance of 0~20Ω, and the resistance lines 401, 402, 406 and 407 each have a resistance of about 50~500 Ω.

On the upper surface of the conductive line layer 400, two conductive lines 410 and 411 are spaced apart from each other between the resistance lines 406 and 407 and the conductive lines 408 and 409 which are formed in the mirror shape along with the resistance lines 401 and 402 and the conductive lines 403 and 404. The portions between the conductive lines 410 and 411 are connected by means of the resistance member 412, respectively, for thereby forming the circuit of FIG. 4.

So, when the moisture sensing tape 100 is cut, the cut position can be reliably sensed.

Figure 5:
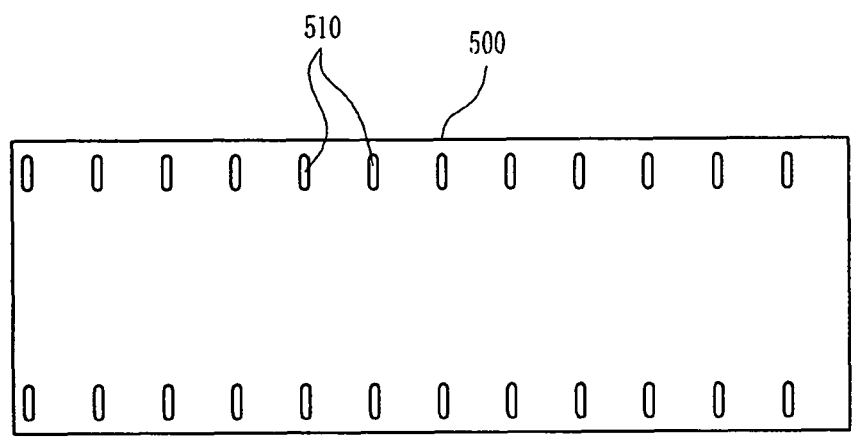
FIG. 5 is a view illustrating a type of a protection film layer.

FIG. 5 is a view illustrating the construction of the protection film layer 500. In case that the protection film layer 500 is stacked on the upper side of the conductive line layer 400, it can be substantially separated from the outside, so that the leakage cannot be sensed by means of the conductive line layer 400 when leakage occurs therein. So, a plurality of holes 510 are formed at regular intervals.

Here, the holes 510 are formed in various shapes such as a longitudinal groove, a circular groove or other shapes in the width wise direction of the moisture sensing tape 100 so that two resistance lines can be exposed through the holes 510. The interval between the neighboring holes 510 is preferably 0.5~1.5 cm.

The leakage sensing procedure will be described according to the present invention.

First, the moisture sensing tape 100 is attached on a certain portion in which moisture will be sensed. Since the moisture sensing tape 100 is formed of an adhesive layer 200 on its lower side, it can be easily attached.

Small level voltages flow between the resistance lines 401 and 402 and the conductive lines 403 and 44.

As leakage occurs, when water or chemical solution or other moisture member (conductive) contacts with a portion of the moisture sensing tape 100, as shown in FIG. 3, a closed circuit is formed by means of the leakage 440 between the resistance line 401 and the resistance line 402. Since resistance value and voltage may change depending on the position of the leakage 400, as shown in FIG. 7, the controller 900 receives a resistance value and a voltage value, and the distance depending on the resistance value and the voltage value is computed.

The controller 10 compares the computed value with a set value and indicates a sensed distance, and generates alarm.

Figure 4:
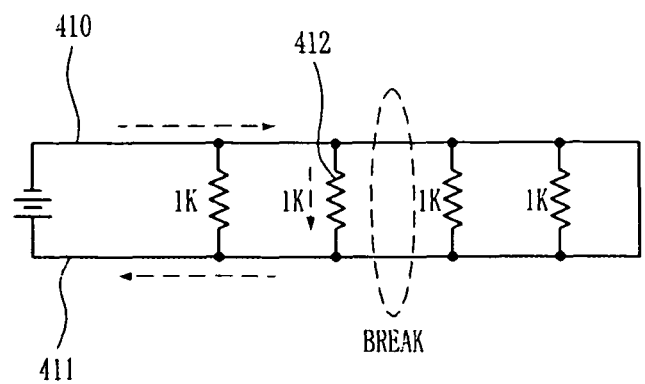
FIG. 4 is a circuit diagram of a pattern for a tape cutting sense.

When the moisture sensing tape 100 is cut by means of a certain external impact or force, the cut state is sensed. Since a plurality of the resistance members 412 are installed at regular intervals, respectively, as shown in FIG. 4, when a certain section is cut, the resistance value of the resistance member just before the cut portion is read by the controller 900 for thereby computing the cut position.

Figure 7:
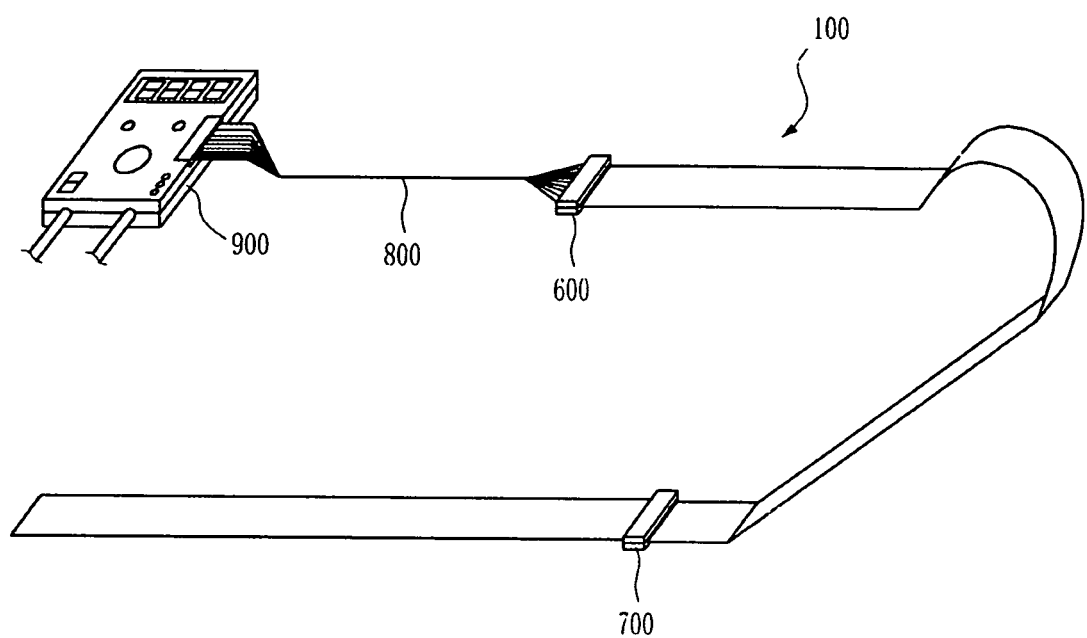
FIG. 7 is a view illustrating a connection state between a controller and another tape.

FIG. 7 is a view illustrating a state that a plurality of moisture sensing tapes 100 are extended and connected, and a connection state with the controller 900. When a longer tape is needed, the moisture sensing tapes 100 are connected with one another by using a connector 700. The conductive line layer 400 and the signal line 800 are connected through the connector 600 and are connected with the controller 900.

Figure 6:
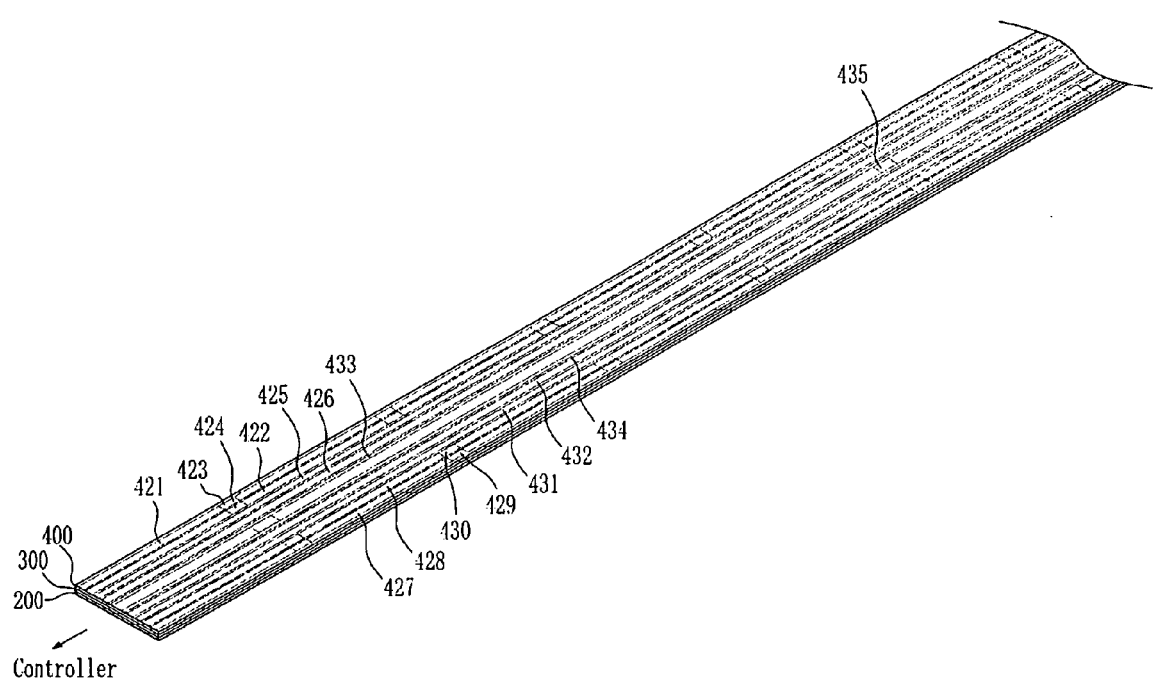
FIG. 6 is a view of another example of a leak sensor apparatus for sensing moisture according to the present invention.

FIG. 6 is a view illustrating another pattern formation state of the conductive line layer 400. The conductive lines 421, 422, 425, 426, 433 and 427, 428, 531, 432, 434 are spaced apart from one another and are sequentially formed in the mirror shape from both outer sides of the conductive line layer 400. Resistance members 423, 424 and 429, 430 are formed in the conductive lines 421, 422 and 427, 428, respectively, at regular intervals.

The conductive lines 421, 422 and 425, 526 connected with the resistance members 423 and 424 form the circuit of FIG. 3 for thereby implementing a leakage sensing operation, and in the same manner, the conductive liens 427, 428 and 431, 432 connected with the resistance members 429 and 430 form the same circuit as the above.

The circuit for sensing a cut state of the moisture sensing tape 100 is formed in the same manner as FIG. 2. The resistance members 435 are connected between the conductive lines 433 and 434 corresponding to the intermediate portion at regular intervals, so that the cutting state can be sensed as shown in FIG. 4.

As described above, in a leak sensor apparatus for sensing moisture according to the present invention, since it can be easily attached to a possible leakage portion such as a wall, a pipe, a facility or something by an adhesive tape method, an installation is very easy.

In addition, the leak sensor apparatus of the present invention can be easily installed without using a bracket. A user can cut the sensor tape by a desired length, which leads to a very economical effect.

Since the tape film is made of PET, PTFE, PVC or something, it is very strong to a chemical solution such as strong acid, strong alkali, organic liquid, etc. When the tape film is installed on a floor, since the thickness of the film is very thin, and it is adhesive, people, facility, cart or something can pass over the installed area of the product. So, an easier installation and maintenance are implemented.

A plurality of tapes can be connected with one controller (AMP), respectively, by cutting one sensor tape into multiple pieces.

The time needed for overcoming moisture leakage portions after the leakage is sensed is very short. Since the present invention is made of a tape film, overcoming the moisture leakages is very easy.

Since a sensor tape method is directed to a printing method, the price is low, and it is possible to effectively sense as large as wide areas at a lower cost and in an easier method.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An improved leak sensor apparatus for sensing moisture, comprising:
   an adhesion layer including a first surface to be attached to a target and a second surface opposite to the first surface;
   a base film layer attached to the second surface of the adhesion layer;
   a conductive line layer on the base film layer; and
   a protection film layer on the conductive line layer,
   wherein:
   said conductive line layer includes a first resistance line and a second resistance line spaced apart from the first resistance line, each having a certain resistance value per unit area in a longitudinal direction,
   said protection film layer is provided with a plurality of holes which are formed at regular intervals, the plurality of holes includes a hole having such a size that both of the first and second resistance lines are exposed to an outside through said hole, and
   said conductive line layer further includes:
   a first conductive line whose physical orientation is in parallel with respect to the first resistance line, and a second conductive line whose physical orientation is in parallel with respect to the second resistance line;
   a third conductive line and a fourth conductive line that are formed in longitudinal directions in the conductive line layer; and
   resistance members formed between the third and fourth conductive lines at regular intervals, respectively,
   wherein each resistance member connects the third conductive line and the fourth conductive line.

2. The apparatus of claim 1, wherein said hole is not filled with an electric terminal but is configured to be empty allowing a foreign material from the outside to enter said hole.

3. The apparatus of claim 1, wherein the first conductive line, the first resistance line, the second conductive line and the second resistance line are electrically connected with one another in series.

4. An improved leak sensor apparatus for sensing moisture, comprising:
   an adhesion layer including a first surface to be attached to a target and a second surface opposite to the first surface;
   a base film layer attached to the second surface of the adhesion layer;
   a conductive line layer on the base film layer;
   a protection film layer on the conductive line layer,
   wherein:
   said conductive line layer includes a first conductive line formed in a longitudinal direction and having conductivity, with a plurality of resistance members each having a certain resistance value per unit area being connected at regular intervals, and further includes a second conductive line which is spaced apart from the first conductive line and a physical orientation of the second conductive line is in parallel with respect to the first conductive line, and
   said protection film layer is provided with a plurality of holes at regular intervals so that the first and second conductive lines of the conductive line layer can be exposed to an outside through the holes, respectively, and the holes are not filled with an electric terminal but are configured to be empty allowing a foreign material from the outside to enter the holes.

5. The apparatus of claim 4, further comprising:
   a third conductive line and a fourth conductive line which are formed in longitudinal directions in the conductive line layer, and
   resistance members formed between the conductive lines at regular intervals, respectively,
   wherein each resistance member connects the third conductive line and the fourth conductive line.

* * * * *